July 9, 1968   M. MORSE   3,391,720
SPIRAL SHAPED THREADED LOCKING FASTENER
Filed Oct. 12, 1966

United States Patent Office 3,391,720
Patented July 9, 1968

3,391,720
SPIRAL SHAPED THREADED
LOCKING FASTENER
Milton Morse, 41 Honeck St.,
Fort Lee, N.J. 07024
Filed Oct. 12, 1966, Ser. No. 586,296
10 Claims. (Cl. 151—14)

ABSTRACT OF THE DISCLOSURE

Threaded fasteners having a shank having an axis in the form of a spiral deviated radially within the length of the shank through an arcuate distance of at least 300 degrees, whereby when the screw is being tightened, it tends to flex in such a way as to open the spiral, thereby allowing smoother passage over the threads of the object with which it is engaged, and when the tightening effect is released the spiral tends to return to its unstressed condition, thereby simultaneously improving the purchase of the thread.

---

This invention relates generally to fasteners and more particularly to locking fasteners and screws.

There are many assemblies in which fasteners, studs, and screws are used to connect two or more parts together, the parts being subject to wear and vibration which causes the fasteners to loosen and the assembly to come apart.

It is among the objects of the present invention to provide novel and useful fastener construction in which the axis of the fastener or screw is spiraled and the spiral makes at least 300° of one complete coil per length of screw; and may indeed make one or more spirals per length of screw.

Another object lies in the provision of locking screw construction which produces a minimum of damage to the screw itself as well as to the threaded opening with which it is engaged, so that the screw may be removed and re-engaged a number of times while still maintaining high friction auto-binding and an inherently high degree of vibration resistance in the fastenening.

These objects and other incidental ends and advantages will more fully appear in the progress of this disclosure and be pointed out in the appended claims.

In the drawings in which similar reference characters designate corresponding parts throughout the several views:

FIGURE 1A being a screw with a right hand spiral and FIGURE 1B being a screw with a left hand spiral.

In accordance with the present invention, the screw has a spiral shank which produces, in effect, a portion of a coiled spring. Screws fabricated in this fashion exert radial pressure against the walls of the confining threaded hole into which they are inserted. This radial pressure in turn produces a high degree of friction between the inserted screw and the threaded hole thus minimizing the possibility of said screw working its way loose under vibration. Other curls and shapes may also be utilized in the shank of the screw in order to obtain the same spring effect, however, I have found that the spiral tends to distribute the radial pressure throughout the entire length of the engaged threads whereas a curved screw exerts pressure only at three points. The disadvantage of this latter method is that the threads at the three high pressure points are apt to become malformed or abraded whereas when the pressure is exerted throughout several threads, the malformation or abrasion is reduced and, consequently, the vibration resistant characteristics are maintained even after several insertions and withdrawals of the screw. Also I have found that a spiraled screw shows a higher resistance to dislodgement by vibration even though it is not fully inserted whereas bent screws do not exert their full effect until they are fully inserted or unless they are severely overbent. These facts create the need for the present invention. Right hand spirals appear to work best with right hand threads and left hand spirals work best with left hand threads.

Figure 1A:
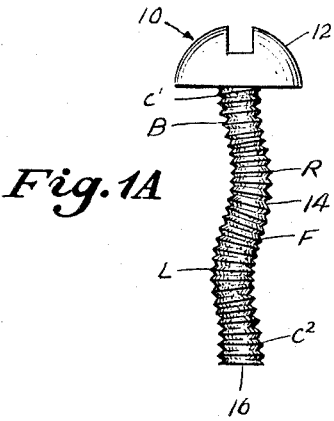
FIGURES 1A and 1B are exaggerated elevational views of embodiments of the invention.
Figure 3A:
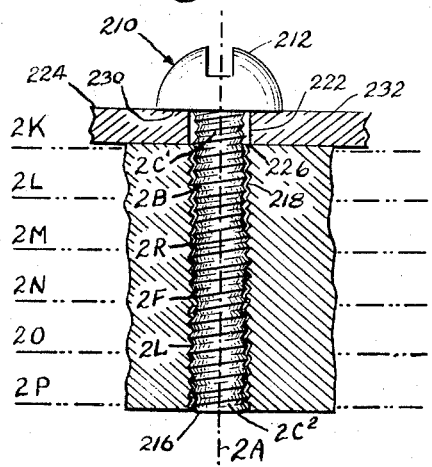
FIGURE 3A is an exaggerated sectional view showing a screw like that in FIGURE 2 connecting two parts.
Figure 3B:
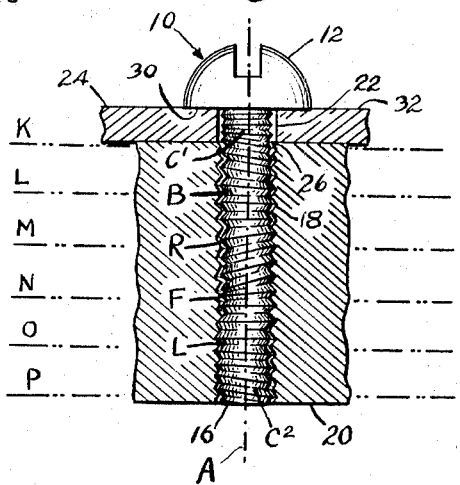
FIGURE 3B is an exaggerated sectional view showing a screw like that in FIGURE 1A connecting two parts.
Figure 4:
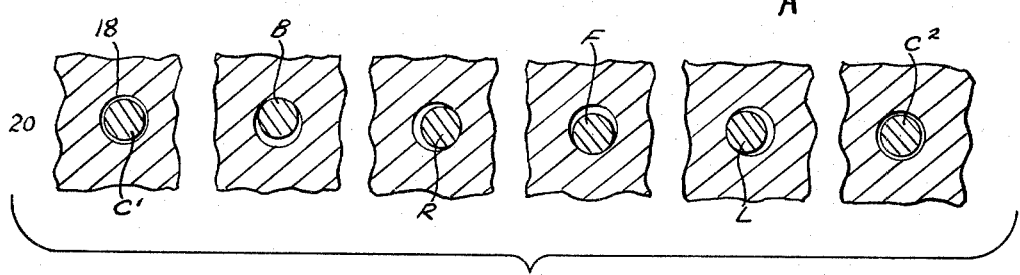
FIGURE 4 is a schematic showing exaggerated sectional views at the planes K–P inclusive on FIGURE 3B, respectively.

Turning to FIGURES 1A, 3B and 4, a screw generally indicated by 10 comprises a head 12, a shank 14, and an end 16. The screw may be of any known type of construction and composed of any suitable material. While I have chosen to illustrate the invention by a regular machine screw with a round head, other kinds of screws or bolts may utilize my invention. As seen in the drawings, the screw 10 has a spiral configuration which goes in a right hand or clockwise direction as viewed from above in FIGURE 1A.

The shank 14 is divided into six zones or portions $C^1$, B, R, F, L, and $C^2$. The portions $C^1$ and $C^2$ are concentric with the normal axis A. Portion B radially deviates toward the back, away from the viewer, in FIGURE 1A. Portion R radially deviates toward the viewer's right. Portion F radially deviates frontward toward the viewer in FIGURE 1A. Portion L radially deviates toward the viewer's left.

The amount of spiraling or radial deviation will depend upon the resiliency of the material of which the screw 10 is composed and upon the clearance offered by the tapped hole 18 within which it becomes engaged. With standard clearances, I have found for example that .008" total indicator run out is ample for an 8–32 x ½" screw produced by a radial deviation of .004 inch.

In general, the amount of radial deviation is affected by the amount of clearance between the screw 10 and the hole 18 and is preferably accommodated to generally recognized standard clearances. Thus, for example, in different sizes of screws the radial deviation should range between 2% to 6% of screw pitch diameter. For satisfactory operation, the radial deviation from the true axis of the threaded shank of the screw should substantially exceed more than half of the total clearance between the screw and the tapped hole.

Figure 1B:
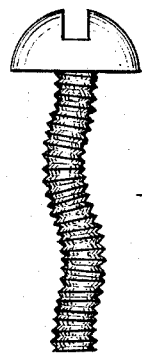

In FIGURE 1A I have illustrated and described a right hand thread screw with a right hand spiraled axis. It will be understood that the invention may be practised with equal utility using a left hand thread screw with a left hand spiraled axis as shown in FIGURE 1B. I have found that it is advantageous to have the spiral running in the same direction as the thread for a number of reasons explained below.

The torque used in tightening the screw tends to straighten the screw, thus making it easier to enter the tapped hole. When the tightening torque is removed from the screw, the screw seeks to return to its spiral shape and thus becomes a tighter fit in the threaded hole. This enhances the anti-dislodgement character of this fastener; also, where the screw is being tightened, it elongates slightly and then when the torquing action is removed, the screw seeks to return to its spiral shape. It thus becomes shorter and holds the various parts together under spring tension.

The portion $C^2$ being concentric with the true axis center or normal axis A may enter the hole 22 in the part 24 and the mouth 26 of the tapped hole 18 in the part 20 in an easy and normal manner, thus permitting use of the present screws in automatic screw inserting machines or equipment. Thus, because of the spiral shape of the screw 10 and the axial alignment of the zones $C^1$, $C^2$, and the head 12, the screw 10 enters the mouth 26 of the tapped hole 18 without wobble. The portion $C^1$ being concentric with the true axial center or normal axis A enables the under surface 30 of the head 12 to approach the outer surface 32 of the part 24 in a parallel manner so that the surface 32 is compressed and cutting or abrasion are kept to a minimum. When properly engaged the screw is disposed at the planes K–P inclusive as shown in schematic FIGURE 4. When the invention is incorporated in longer screws a greater resiliency or spring action results. This fact can be used to advantage for the reasons given above. It must be understood of course that the torque for proper usage shall not exceed the maximum yield point of the screw. In order to have satisfactory operation, the spiral must extend through at least 300° of a full coil. Omitting the head 12 will produce a device having the qualities of the present fastener.

Figure 2:
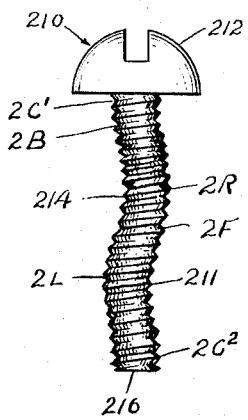
FIGURE 2 is an exaggerated elevational view of a modification having a spiral shank with true pitch angle.

Turning now to the modification shown in FIGURES 2 and 3A, to avoid needless repetition, certain of the parts and sections corresponding to FIGURES 1A and 3B are given the same reference characters and designations, respectively, with the addition of a prefix "2." This modification differs from the embodiment of FIGURE 1A in that although the shank is spiral, the threads 211 have true pitch angle. Fabrication of screw 210 is described in my copending application Ser. No. 589,479; filed Oct 11, 1966.

It will thus be seen that I have provided novel and useful fastener construction which acts not only to hold connected parts joined together but because of its spring action and resistance to the effects of shaking and vibration, prevents the screw from loosening unless it is removed by positive rotation and withdrawal by the user.

I wish it to be understood that I do not desire to be limited to the exact details of construction shown and described for obvious modifications will occur to a person skilled in the art to which the present invention pertains.

I claim:

1. A threaded fastener comprising: a shank; said shank having the axis thereof in the form of a spiral deviated radially through at least 300° of a full coil within the length of said shank.

2. A threaded fastener as claimed in claim 1 in which the spiral is continued for at least a full 360°.

3. Structure as claimed in claim 1 in which the shank is provided with a head.

4. Structure as claimed in claim 1 provided with a head and in which a substantial portion of the shank adjoining the head is concentric with the normal axis of the shank.

5. Structure as claimed in claim 1 and having an end, a substantial portion of the screw shank at said end being concentric with the normal axis of the shank.

6. Structure as claimed in claim 4 and having an end, a substantial portion of the shank at said end being concentric with the normal axis of the shank.

7. Structure as claimed in claim 1 in which the radial deviation of the spiral axis is in the range of 2% to 6% of screw pitch diameter.

8. Structure as claimed in claim 1 and a part having a threaded hole, the radial deviation of the shank being substantially more than one-half of the total transverse clearance between the connector and said hole.

9. Structure as claimed in claim 1 in which the deviation of the thread and the direction of the spiral are the same.

10. Structure as claimed in claim 1 in which the deviation of the thread and the direction of the spiral are opposite.

References Cited

UNITED STATES PATENTS 2,361,107  10/1944  Johnson _____ 151—22

FOREIGN PATENTS

| 210,677 | 8/1960 | Austria. |
| 736,058 | 9/1932 | France. |
| 958,192 | 9/1949 | France. |
| 650,741 | 2/1951 | Great Britain. |
| 918,265 | 2/1963 | Great Britain. |

MARION PARSONS, Jr., *Primary Examiner.*